(12) United States Patent
Bussard et al.

(10) Patent No.: US 6,598,196 B1
(45) Date of Patent: Jul. 22, 2003

(54) TECHNIQUE FOR CORRECTING ERRORS IN POSITION ENCODERS

(75) Inventors: Paul E. Bussard, Santa Rosa, CA (US); Zoltan D. Azary, Occidental, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/515,577

(22) Filed: Feb. 29, 2000

(51) Int. Cl.[7] .................. G06F 11/30; G08C 25/00; H04B 1/10
(52) U.S. Cl. ......................... 714/746; 375/350
(58) Field of Search .................. 714/746, 752, 714/755, 799, 798; 375/350, 224, 341; 369/43, 44.1, 44.25, 44.26, 44.32, 47.35, 53.35, 59.21

(56) References Cited

U.S. PATENT DOCUMENTS

| | | | | |
|---|---|---|---|---|
| 4,825,055 A | * | 4/1989 | Pollock | 235/411 |
| 5,576,902 A | * | 11/1996 | Lane et al. | 386/68 |
| 6,285,522 B1 | * | 9/2001 | McKenzie et al. | 360/77.05 |
| 6,345,074 B1 | * | 2/2002 | Turk et al. | 375/341 |

* cited by examiner

*Primary Examiner*—Christine T. Tu
(74) *Attorney, Agent, or Firm*—Robert T. Martin

(57) ABSTRACT

Measurement and correction of encoder errors in a servo loop. By driving the servo system on a predetermined trajectory such that encoder errors occur at frequencies outside the servo loop response, these errors are sampled. Sampled encoder error data is filtered to produce correction data, which may be applied inside or outside the servo loop.

27 Claims, 4 Drawing Sheets

TECHNIQUE FOR CORRECTING ERRORS IN POSITION ENCODERS

BACKGROUND OF THE INVENTION

1. Field of the Invention

The present invention relates to the correction of errors in position encoders used in servo systems.

2. Art Background

Servo systems are commonly used to control the position or movement of one object in relation to another. A typical servo loop drives a motor to position a mechanism in response to an input "target" position. Typical servo loops use a compensator such as a simple PID (Proportional, Integral, Derivative) or other more advanced compensators, to provide stable, predictable response.

In such a system, the encoder provides the only means by which the loop measures position and from which it is possible to calculate derivatives of position, such as velocity and acceleration. It is also possible to calculate integrals of position. Because of nonlinearities and other errors in the encoder, the indicated position of the mechanism may deviate from its actual position. The "actual" position is unknowable to the servo in such a system; only the "indicated" position is known. Therefore, errors in the encoder affect the overall accuracy obtainable by the servo loop, and the performance of the system in which it is embedded.

The servo loop corrects for indicated position errors, as long as they occur at frequencies which are within the frequency response of the loop. As is known in the art, the loop response, in both amplitude and phase versus frequency, controls the stability of the loop. Modern control systems operate mostly in the digital domain, sampling the state of the system and generating motor control signals. In a perfect position encoder, the "actual" position would match the indicated position. However, due to imperfections in the position encoder, an indicated position may exhibit an offset (error) from the actual position. When intending to move at a velocity slow enough for the servo system to track the encoder errors, velocity errors will occur as the encoder imperfections are encountered.

Past systems made use of external references to detect encoder errors. What is needed is a way to correct for errors and nonlinearities in the encoder in a servo system, without using external references.

SUMMARY OF THE INVENTION

Encoder errors in a servo loop are modeled as disturbances having an amplitude and spectral distribution related to the structure of the encoder. These encoder errors are sampled by deliberately driving the system on a predetermined trajectory such that the dominant frequency components of the encoder errors fall outside the frequency response of the servo loop. The sampled encoder data is filtered to produce correction data. A first method of filtering employs a high pass filter. A second method of filtering first removes the predetermined trajectory from the sampled data, and then applies a high pass filter.

BRIEF DESCRIPTION OF THE DRAWINGS

The present invention is described with respect to particular exemplary embodiments thereof and reference is made to the drawings in which.

DETAILED DESCRIPTION

Servo systems are used in a wide variety of devices for position and control.

Figure 1:
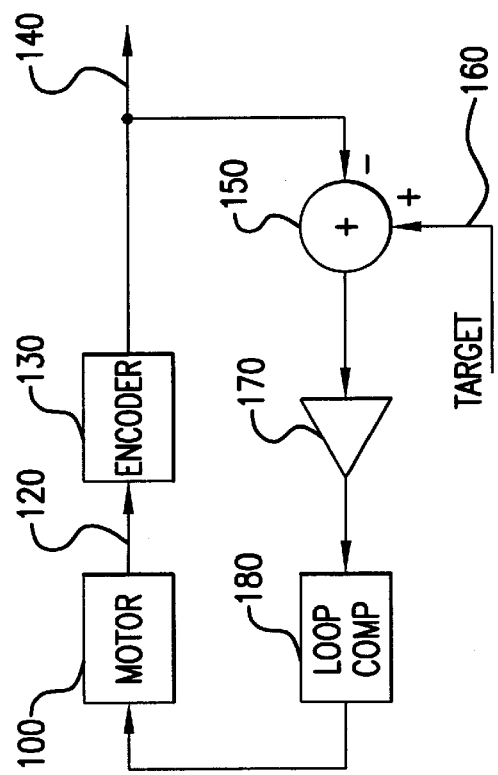
FIG. 1 shows a servo loop.

FIG. 1 shows a servo loop as is known to the art. Motor and motor drive 100 is coupled 120 to encoder 130. Indicated position 140 sensed by encoder 130 is summed 150 with input target signal 160. The resulting difference between indicated and desired position is amplified 170 and passed to loop compensation filter 180, and used to drive motor 100. In practice, summing node 150, amplifier 170, and loop compensation filter 180 are implemented in digital form, such as in a proportional-integral-derivative (PID) controller. Such controllers are available, for example, from National Semiconductor Corporation as the LM 628 and 629, and may also be implemented by programming a digital signal processor (DSP) such as the Texas Instruments TMS320P14.

Motor 100 may be a linear or rotary positioner, with encoder 130 coupled 120 to motor 100 directly or through intermediate means.

Errors in linear encoder 130 may arise from irregularities in the encoder, periodicities due to fabrication methods, misalignment of the encoder, or a combination of these and other factors.

In a rotary position encoder 130 may be an encoding disk connected to motor 100 along a common drive shaft, or may be coupled through a drive mechanism such as gears. While many types of rotary encoders may be used, one common design uses a track of radial lines spaced circumferentially on an optical disk. One track of radial lines may be used, or two tracks may be used concentrically, arranged in quadrature. Quadrature outputs may also be generated from a single track using offset sensors. Absolute encoders, with multiple tracks usually encoding position in the form of a Gray code, may also be used.

While such encoders, usually produced using photolithographic techniques similar to those used in semiconductor manufacturing, are very accurate, errors are always present to some degree. Some lines may be thicker than others, periodic spacing variations may occur, the tracks may not be perfectly circular, or may be off-center with respect to the center of rotation of the encoder disk. Optical encoders typically consist of a light source, light sensor, and a disk containing regularly spaced radial lines. Any misalignment of these elements may also introduce errors.

The aforementioned encoder errors, such as in the encoder lines themselves, the alignment of the lines with respect to each other, or to the center of the encoder disk, or alignment with respect to the sensor assembly, all introduce errors which appear as differences between the actual and indicated positions sensed by the encoder.

Figure 3:
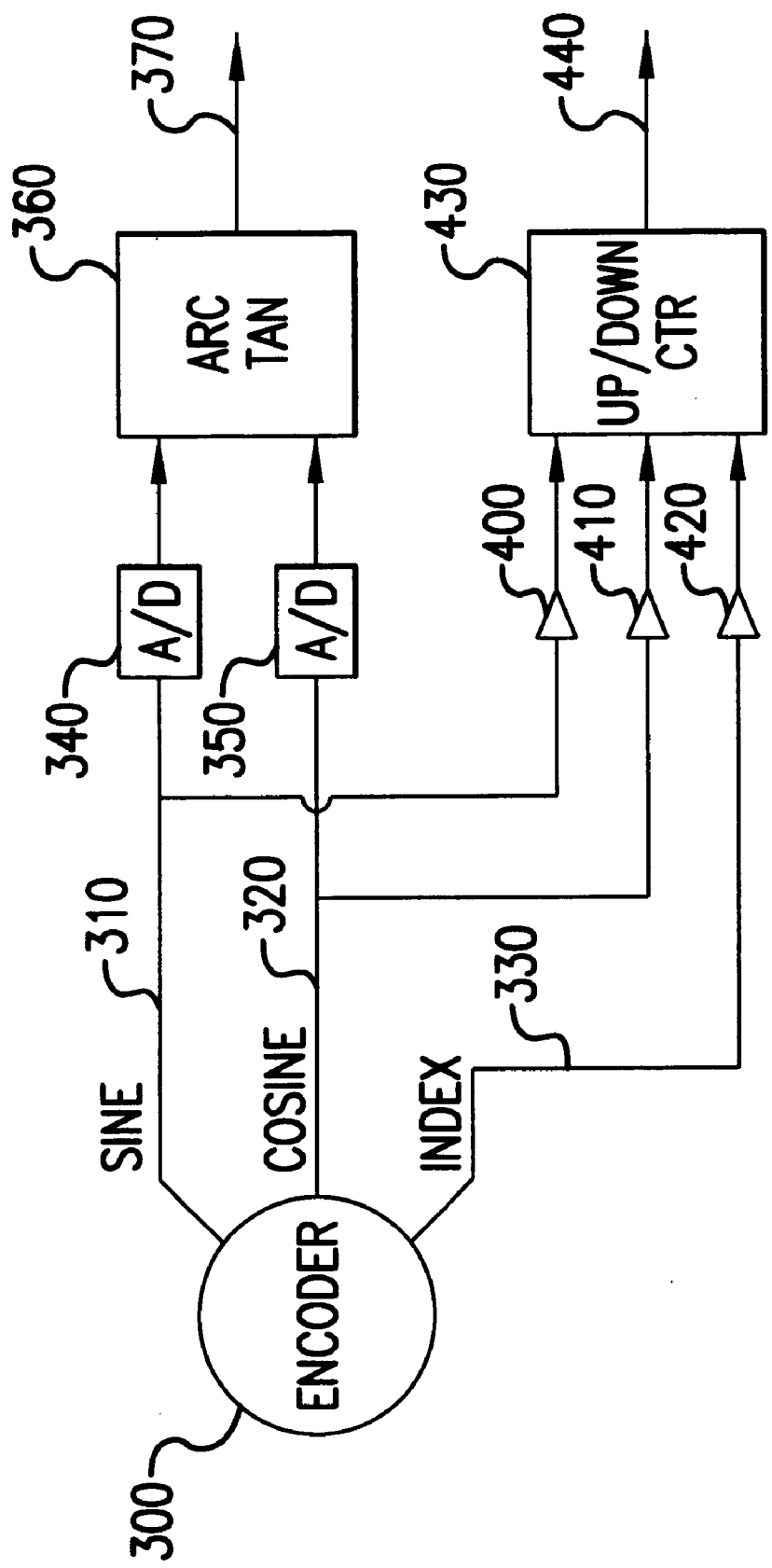
FIG. 3 shows an encoder system using interpolation.

FIG. 3 shows an incremental sine-cosine encoder system using interpolation, as is used in the preferred embodiment.

Other interpolation waveforms and systems may be used, as is known to the art. In the preferred embodiment, encoder wheel 300 is approximately 7 centimeters in diameter, and contains three tracks of radial lines. Two tracks in quadrature contain opaque lines at a spacing of 9000 lines per revolution. By design of the encoder, the output of sine track 310 and cosine track 320 are sinusoidal in nature. The third track is index track 330, producing a signal at a predetermined position of the encoder. Differences between indicated encoder waveforms and expected waveforms of the interpolation process are a significant source of errors.

An encoder system making use of interpolation processes encoder information in two ways. Sine 310 cosine 320, and index 330 are passed through comparators 400, 410, and 420, respectively, producing either a digital one or a digital zero output. These signals are used to drive up/down counter 430, producing counter output 440. Counter output 440 indicates coarse encoder position deduced from counting zero crossings of sine 310 and cosine 320 as the encoder wheel turns. Index 330 is used to initialize the value of up/down counter 430.

Since sine output 310 and cosine output 320 are sinusoidal in nature, these signals may be processed to increase the effective resolution of the encoder through interpolation. Sine signal 310 is converted from analog to digital form by A/D converter 340. Cosine signal 320 is converted by A/D converter 350. These converters each have ten bits of resolution in the preferred embodiment. The output of these A/D converters is fed to arctangent lookup ROM 360. In the preferred embodiment, this interpolation process allows the indicated position of the encoder to be determined to one part in 4096 between individual encoder lines, greatly increasing its resolution.

Figure 2:
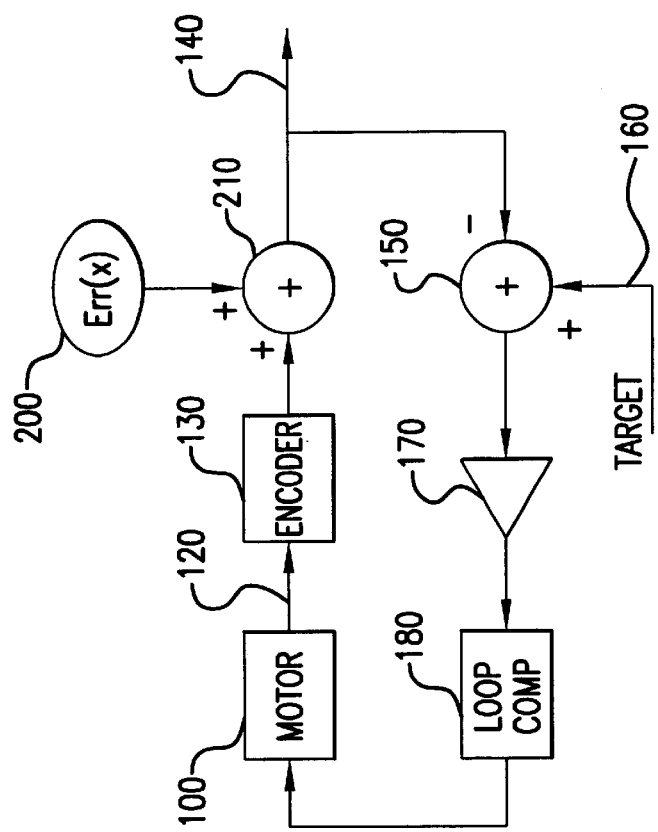
FIG. 2 shows a servo loop according to the present invention.

The present invention models errors in the encoder, interpolated or not, as shown in FIG. 2. Using the same nomenclature as FIG. 1, motor 100 is coupled 120 to encoder 130. Now added to this process is error source 200 and adder 210, resulting in indicated position signal 140, which contains the error. Error function 200 is modeled as a function of encoder position. It is important to note that the error need only be repeatable as a function of encoder position—that for each position x of the encoder, the error Err(x) is the same, or approximately the same, over time. The same position produces the same error. The error is not assumed to be periodic over the surface of the encoder, only repeatable. The frequency components of the error signal are modeled to be related to the velocity of the encoder. Because of the endemic nature of these errors, only indicated position 140, which may contain a nonzero error, is available.

It is well known in the servo art that target input motion is usually kept within the frequency response of the control loop. The art of servo loop design is in designing a control loop with a high frequency response, and yet stable. In digital implementations of servo loops, such as that used in the present invention, the sampling rate in the system is commonly many times the control loop frequency response. The well known Nyquist criteria states that at a minimum, the sample rate must be greater than twice the loop frequency response.

In operation of the loop, as shown in FIGS. 1 and 2, a predetermined trajectory is placed on line 160. Through the feedback process, the difference between the target position on line 160 and the indicated position on line 140 generates signals to motor 100 such that this difference is minimized. Disturbances such as start up inertia, gravitational effects on an unbalanced load, friction, external shock, vibration, or the like are compensated for by the loop, to an extent determined by the control loop gain at the frequency of the disturbance.

Figure 4:
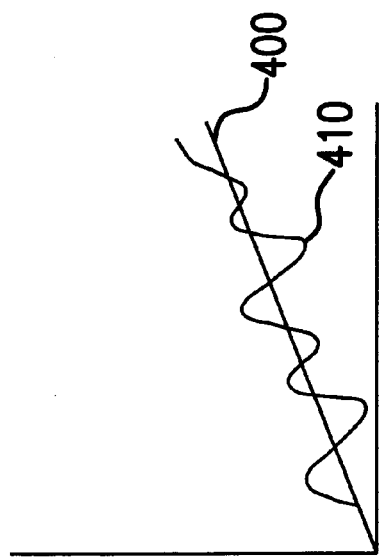
FIG. 4 is a graph of intended and indicated position.

If this is the case, and error source 200 of FIG. 2 is present, how may this error source be measured? FIG. 4 shows a graph of desired and indicated position. Line 400 shows the intended trajectory, in this case motion at a constant velocity. Line 410 shows the indicated trajectory, which is the target trajectory plus encoder errors, plus other systematic errors.

In the present invention, target signal 160 is deliberately generated such that errors related to the encoder generate disturbance frequency components which fall outside the loop bandwidth. When motor 100 is driven at a constant velocity, the inertia of the mechanical system will dominate, and the motion will closely approximate line 400 of FIG. 4. As the error disturbances are outside the loop bandwidth, they cannot be compensated by the loop, and so the signal shown as line 410 of FIG. 4 is sampled.

In the present invention, by driving motor 100 so that the dominant frequency components of the encoder errors fall outside the servo loop bandwidth, the system samples the indicated position as the sum of actual (or desired) position plus the error, at each motor position.

To derive the correction data from this data, the actual position signal must be removed. In one embodiment of the invention, this is done by high pass filtering. In the preferred embodiment, the loop bandwidth is approximately 100 Hz. The sample rate of the control loop is 7.8 kHz. Motor 100 is driven at a rate such that encoder lines pass through the encoder at a rate above the loop frequency response, such as 800 Hz, where the loop response is down 24 dB and therefore has negligible response to encoder error components occurring at the encoder line spacing.

High pass filtering this resulting signal combining the desired and error signals removes portions of the desired trajectory.

Figure 5:
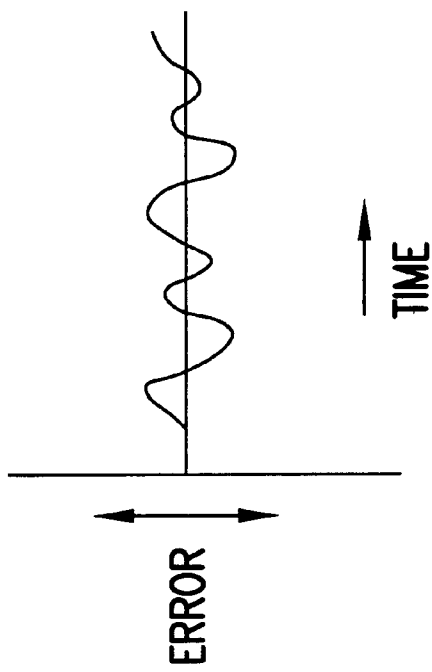
FIG. 5 is a graph of filtered correction data.

While this simple filtering may be sufficient for some purposes, more accurate results are obtained by first removing the desired trajectory from the composite data. This is easily achieved by performing a least-squares fit on the data, fitting a straight line to the constant velocity profile. With this least-squares fit, the straight line may be removed from the dataset, leaving the error signal and any low frequency systematic errors not related to the position encoder. This is shown in FIG. 5.

The error signal still must be high-pass filtered to remove low frequency systematic errors, such as those resulting from the inertia of the system being insufficient to produce the desired trajectory. In the preferred embodiment, this is performed using a finite-impulse-response (FIR) high pass filter designed using the Parks-McClellan algorithm with a filter length of 255 points. This filter has the properties that it provides a very sharp amplitude versus frequency response at cutoff, is relatively flat in the pass band, and most important, it provides constant delay. In the preferred embodiment, the delay of the filter is a constant 127 samples. Thus, the output of the filter may be simply shifted 127 positions to associate a particular residual value with its motor position. If other known systematic error sources are present, it may be desirable to alter filter characteristics to accommodate these errors. For example, a band-pass filter may be used, or multiple band pass, or a filter including notches may be used.

Having determined the encoder error at each sampled position, the motor position for applying a correction for that error can be found from the original unfiltered sample data. Both of these data sets are ordered by the sampling sequence, so the error correction for sample s(i) is applied at the motor position originally indicated at sample s(i).

As a result of this process, a table or list of errors associated with motor position is provided, from which correction data is calculated as the negative of the encoder error data.

The process of collecting and calculating the correction data may be initiated automatically, or on user request. In one embodiment, correction data is collected during device self-test. In a second embodiment, correction data is collected during device self-calibration, which may be initiated by the user. The collection and calculation of the correction data may require the connection or addition of components not required during normal system operation.

Figure 6:
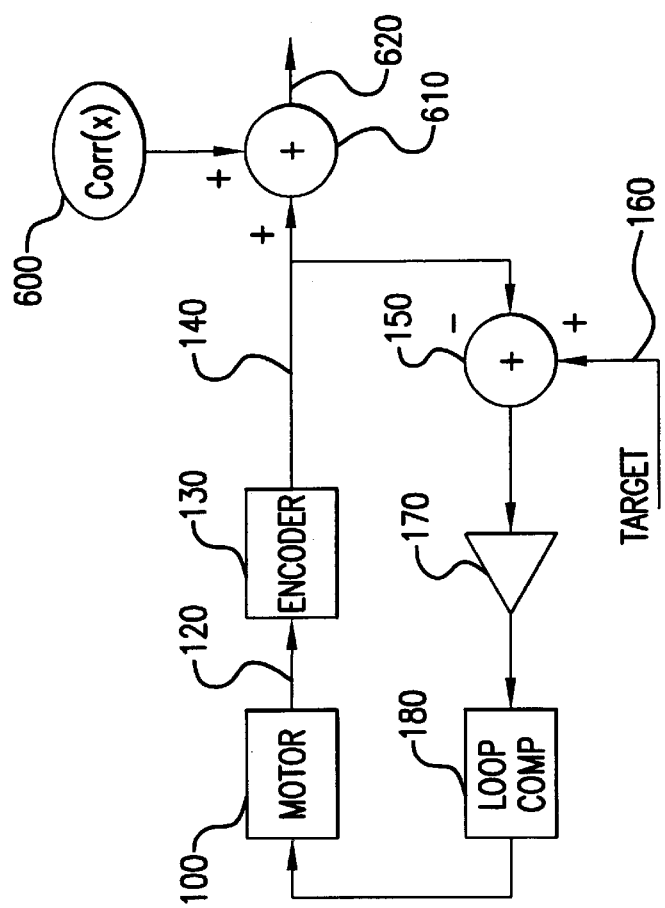
FIG. 6 shows a first embodiment of the present invention.

FIG. 6 shows a first embodiment of the invention making use of the correction data so derived. Indicated position 140 from encoder 130 is fed to summer 610 where correction data 600 is added in, producing corrected position 620. Correction data 600 is generated as described above, preferably as a list or array of correction values indexed by indicated motor position. This list may be kept over the entire range of motor positions, or over a subset of that range. In the preferred embodiment, because of sampling speed limitations, correction data is kept for motor positions approximately 128 positions apart and linear interpolation is used to calculate corrections for intervening motor positions.

In instrument use, the servo loop is typically used to position apparatus used in taking measurements. Assume these measurements result in a list of $(x_i,y_i)$ pairs, where $x_i$ is the motor position, and $y_i$ is the measurement value for sample i. Because of errors in the encoder, position $x_i$ is not the actual position, but an indicated position containing an error value. Given the correction values, the measurement list may be restated as containing pairs of the form $(x_i+\text{corr}(x_i),y_i)$ where $\text{corr}(x_i)$ is the correction value for motor position $x_i$.

Figure 7:
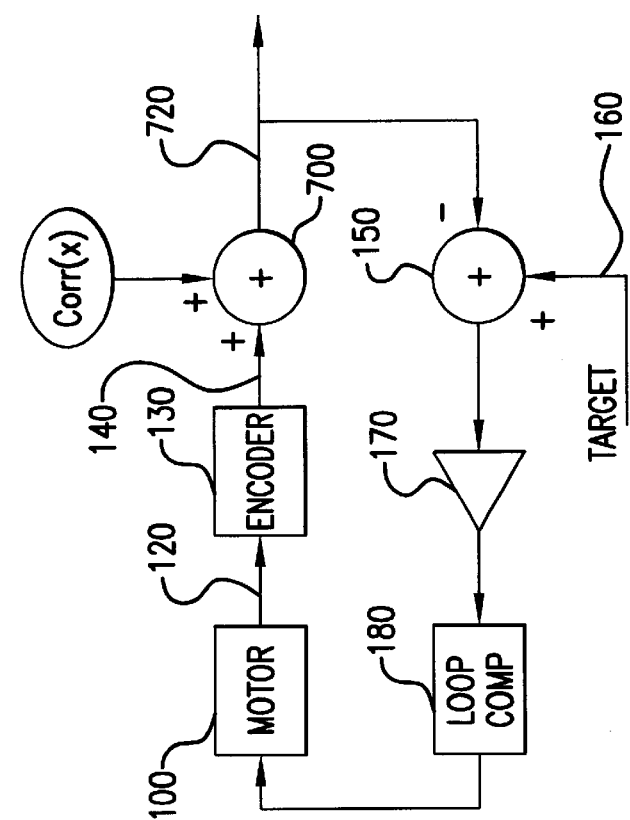
FIG. 7 shows a second embodiment of the present invention.

An alternative approach is to use this correction data within the control loop, and correct the position from the encoder during loop operation, thus attaining better positioning accuracy. This embodiment is shown in FIG. 7. Using the same basic nomenclature as before, encoder 130 produces indicated position 140, containing encoder errors. Summer 700 adds in correction data 710, producing corrected position 720, which is fed to summer 150. In practice, this implementation requires a fast memory device to hold the correction data, which as before, is indexed by indicated motor position, and an additional arithmetic step in the loop to perform the compensation.

In measuring encoder errors, frequency components of the encoder errors up to the Nyquist limit of one half the sample frequency may be measured using the same predetermined trajectory. To measure other encoder errors with different frequency components, a different trajectory may be used to similarly place those encoder errors within this same measurement frequency range.

While the preferred embodiment makes use of a constant velocity trajectory, any predetermined trajectory may be used. The constant velocity trajectory offers the advantages of providing constant sampling frequencies due to the constant velocity, and ease of removing the resulting intended trajectory from the sampled data containing the intended trajectory plus errors.

In some systems, it may be necessary to change the loop bandwidth in order to make the encoder measurement. For example, if the velocity needed for the predetermined trajectory were higher than the system could achieve or survive, then loop bandwidth could be lowered during encoder error measurement.

While the present invention teaches sampling and measuring encoder errors at frequencies where the loop response is negligible, sampling may be done closer to the range in which the loop is responsive. In such cases, using independently determined frequency and phase response information for the loop, the loop response at a particular point may be calculated and added into the error value.

The encoder error measurement process may be repeated a number of times and the results averaged to reduce measurement uncertainty and improve measurement resolution. The encoder error measurement process may be performed as part of initial system setup. It may also be performed as part of a system self-check or calibration, such as on system startup, as a result of a user request, or as a part of a periodic system process.

The foregoing detailed description of the present invention is provided for the purpose of illustration and is not intended to be exhaustive or to limit the invention to the precise embodiments disclosed. Accordingly the scope of the present invention is defined by the appended claims.

What is claimed is:

1. The method of determining servo loop encoder errors comprising the steps of:

generating a target trajectory such that the frequency components of the encoder errors are outside the servo loop bandwidth, feeding the target trajectory to the servo loop, sampling the encoder output along the target trajectory, producing a data set containing trajectory plus errors, removing the target trajectory from the data set, and filtering the data set with the target trajectory removed leaving the encoder errors.

2. The method of claim 1 where the steps of:

feeding the target trajectory to the servo loop, sampling the encoder output along the target trajectory, producing a data set containing trajectory plus errors, removing the target trajectory from the data set, and filtering the data set with the target trajectory removed leaving the encoder errors, are repeated a plurality of times with the same target trajectory and the resulting encoder errors combined.

3. The method of claim 1 where the steps of:

generating a target trajectory such that the frequency components of the encoder errors are outside the servo loop bandwidth, feeding the target trajectory to the servo loop, sampling the encoder output along the target trajectory, producing a data set containing trajectory plus errors, removing the target trajectory from the data set, and filtering the data set with the target trajectory removed leaving the encoder errors, are repeated a plurality of times with different target trajectories, and the resulting encoder errors combined.

4. The method of claim 1 where the generated target trajectory is a constant velocity trajectory.

5. The method of claim 1 where the filter used in filtering the data set is a high-pass filter.

6. The method of claim 5 where the high-pass filter has constant delay.

7. The method of claim 1 where the filter used in filtering the data set is a band-pass filter.

8. The method of claim 7 where the band-pass filter has constant delay.

9. The method of claim 1 where the servo loop has a first loop bandwidth used during normal operation, and a second loop bandwidth lower than the first loop bandwidth, which is used during the encoder error determining process.

10. A method of correcting for servo loop encoder errors comprising:
   producing a set of encoder errors by the steps of:
      generating a target trajectory such that the frequency components of the encoder errors are outside the servo loop bandwidth,
      feeding the target trajectory to the servo loop,
      sampling the encoder output along the target trajectory, producing a data set containing trajectory plus errors,
      removing the target trajectory from the data set, and
      filtering the data set with the target trajectory removed leaving the encoder errors, and
   applying the set of encoder errors outside the servo loop.

11. The method of claim 10 where in the process of producing a set of encoder errors the steps of:
   feeding the target trajectory to the servo loop,
   sampling the encoder output along the target trajectory, producing a data set containing trajectory plus errors,
   removing the target trajectory from the data set, and
   filtering the data set with the target trajectory removed leaving the encoder errors,
   are repeated a plurality of times and the resulting encoder errors combined.

12. The method of claim 10 where the steps of:
   generating a target trajectory such that the frequency components of the encoder errors are outside the servo loop bandwidth,
   feeding the target trajectory to the servo loop,
   sampling the encoder output along the target trajectory, producing a data set containing trajectory plus errors,
   removing the target trajectory from the data set, and
   filtering the data set with the target trajectory removed leaving the encoder errors,
   are repeated a plurality of times with different target trajectories, and the resulting encoder errors combined.

13. The method of claim 10 where the generated target trajectory is a constant velocity trajectory.

14. The method of claim 10 where the filter used in filtering the data set is a high-pass filter.

15. The method of claim 14 where the high-pass filter has constant delay.

16. The method of claim 10 where the filter used in filtering the data set is a band-pass filter.

17. The method of claim 16 where the band-pass filter has constant delay.

18. The method of claim 10 where the servo loop has a first loop bandwidth used during normal operation, and a second loop bandwidth lower than the first loop bandwidth, which is used during the encoder error determining process.

19. A method of correcting for servo loop encoder errors comprising:
   producing a set of encoder errors by the steps of:
      generating a target trajectory such that the frequency components of the encoder errors are outside the servo loop bandwidth,
      feeding the target trajectory to the servo loop,
      sampling the encoder output along the target trajectory, producing a data set containing trajectory plus errors,
      removing the target trajectory from the data set, and
      filtering the data set with the target trajectory removed leaving the encoder errors, and
   applying the set of encoder errors inside the operation of the servo loop.

20. The method of claim 19 where in the process of producing a set of encoder errors the steps of:
   feeding the target trajectory to the servo loop,
   sampling the encoder output along the target trajectory, producing a data set containing trajectory plus errors,
   removing the target trajectory from the data set, and
   filtering the data set with the target trajectory removed leaving the encoder errors,
   are repeated a plurality of times and the resulting encoder errors combined.

21. The method of claim 19 where the steps of:
   generating a target trajectory such that the frequency components of the encoder errors are outside the servo loop bandwidth,
   feeding the target trajectory to the servo loop,
   sampling the encoder output along the target trajectory, producing a data set containing trajectory plus errors,
   removing the target trajectory from the data set, and
   filtering the data set with the target trajectory removed leaving the encoder errors,
   are repeated a plurality of times with different target trajectories, and the resulting encoder errors combined.

22. The method of claim 19 where the generated target trajectory is a constant velocity trajectory.

23. The method of claim 19 where the filter used in filtering the data set is a high-pass filter.

24. The method of claim 23 where the high-pass filter has constant delay.

25. The method of claim 19 where the filter used in filtering the data set is a band-pass filter.

26. The method of claim 25 where the band-pass filter has constant delay.

27. The method of claim 19 where the servo loop has a first loop bandwidth used during normal operation, and a second loop bandwidth lower than the first loop bandwidth, which is used during the encoder error determining process.

* * * * *